J. B. PETRIE & R. C. REBHOLZ.
RUG CLAMP.
APPLICATION FILED SEPT. 8, 1908.

913,159.

Patented Feb. 23, 1909.

UNITED STATES PATENT OFFICE.

JOHN B. PETRIE AND RUDOLPH C. REBHOLZ, OF TULSA, OKLAHOMA.

RUG-CLAMP.

No. 913,159.      Specification of Letters Patent.      Patented Feb. 23, 1909.

Application filed September 8, 1908. Serial No. 452,017.

*To all whom it may concern:*

Be it known that we, JOHN B. PETRIE and RUDOLPH C. REBHOLZ, citizens of the United States, residing at Tulsa, in the county of Tulsa and State of Oklahoma, have invented a new and useful Rug-Clamp, of which the following is a specification.

This invention relates to clamps for securing rugs to carpets or to wooden floors.

One object of the invention is to provide an improved fastening means which will not tear or otherwise harm the web of the carpet to which it is secured.

Another object is to so construct the floor or carpet engaging means that it will be practically invisible when secured in place.

With these and other objects in view as will more fully herein after appear, the present invention consists in certain details of construction and arrangements of parts, hereafter fully described, illustrated in the accompanying drawings, and more particularly pointed out in the appended claims. It being understood that various changes in the form, proportion, size and minor details of the device may be made without departing from the spirit or sacrificing any of the advantages of the invention.

Figure 1:
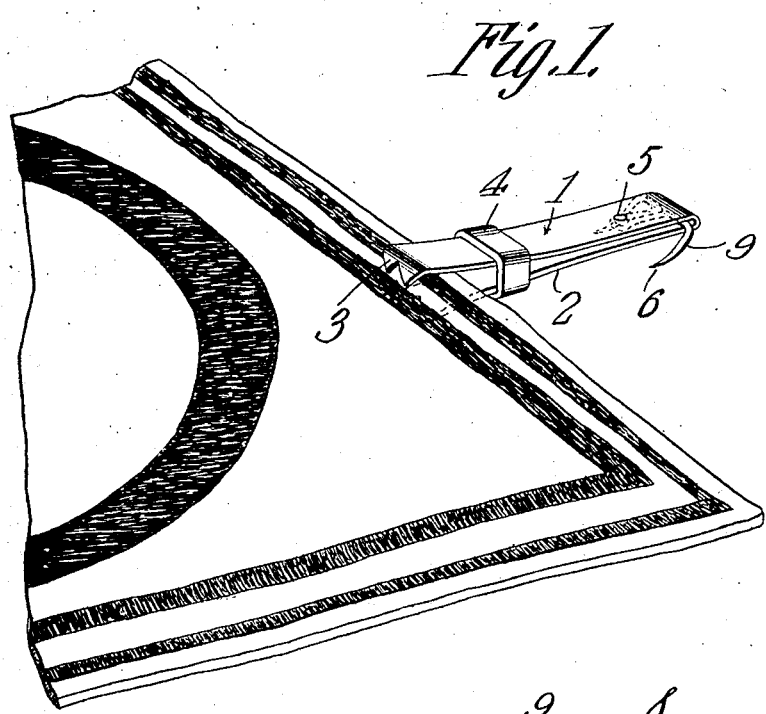
Figure 2:
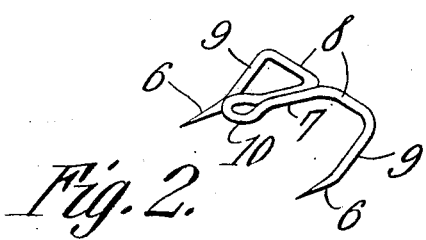

In the accompanying drawings forming a part of this specification; Figure 1 is a perspective view showing the manner of securing a rug in place. Fig. 2 is a detailed perspective of the fastening means.

Similar numerals of reference are employed to designate corresponding numbers throughout.

The invention consists of a pair of clamping jaws designed to engage one edge portion of a rug, and a fastening means interposed between the jaws and designed to be embedded in the floor or carpet.

The clamping member is preferably formed of a piece of spring metal, of suitable length and width which is bent upon itself at its intermediate portion, so as to form jaws 1 and 2. A portion adjacent the free end of each jaw is bent inwardly and at substantially right angles and provided with serrations or teeth 3, which are adapted to interlock when brought together. The two jaws are slightly bowed longitudinally, so as to normally hold the serrated ends apart a distance approximately equal to the thickness of the rug to which they are to be applied. A sliding collar 4, preferably made of sheet metal is designed to encircle the jaws 1 and 2, and operates when moved towards the serrated ends to bring the jaws together.

Extending through the jaws 1 and 2 and adjacent the connected ends thereof is a vertical post or stud 5, the function of which is to form a support for the fastening member. The latter is preferably formed of a single piece of steel wire, the opposite ends of which are pointed as shown at 6. The fastening member is bent upon itself for a portion of its length at its intermediate portion so as to form a shank 7, the length of which is somewhat less than the distance betwen the post 5 and connected end of the clamp. The shank portion 7 terminates in outwardly turned portions 8, the combined lengths of which are equal to the width of the jaws. These outward portions 8 terminate in downwardly and forwardly curved portions 9 which extend towards the serrated ends of the jaws, and are disposed below the plane of the lower jaw 2. The intermediate portion of the fastening member is slightly parted so as to form an eye 10, which is adapted to encircle the post 5. Thus it will be seen when the parts are in position as shown in Fig. 1, the sharpened ends of the fastening member will be disposed on either side, and below the plane of the lower jaw 2, the construction being such that the sharpened ends 6 will extend forwardly to a point approximately in a vertical plane with the eye 10 and post 5. With this construction it is obvious when the sharpened ends 6 of the fastening member are inserted in a carpet or driven into a floor and the serrated ends 3 fastened to the edge of the rug, the fastening member will be invisible, or substantially so.

What is claimed is:—

1. A rug clamp comprising a pair of movable jaws connected together at one end, and means for bringing said jaws together, a vertical post extending through said jaws, a fastening member having its intermediate portion secured to said post and its opposite ends extending downwardly and disposed on either side of said jaws.

2. A device of the class described comprising a pair of opposed integral jaws movable relative to each other, means carried by the jaws for adjusting them toward each other, and a fastening member mounted at an intermediate point between the jaws, the terminals of said member being disposed at
5 the sides of and extending beyond one face of one of the jaws.

In testimony that we claim the foregoing as our own, we have hereto affixed our signatures in the presence of two witnesses.

JOHN B. PETRIE.
   RUDOLPH C. REBHOLZ.

Witnesses:
 W. D. ABBOTT,
 LEOTA CASH.